United States Patent [19]

Moench et al.

[11] 4,278,723

[45] Jul. 14, 1981

[54] SHAPED BODY OF EXTRUDED ACRYLIC GLASS

[75] Inventors: Theodor P. Moench, Gross-Umstadt-Heubach; Friedrich Hanstein, Gross-Zimmern, both of Fed. Rep. of Germany

[73] Assignee: Röhm GmbH, Darmstadt, Fed. Rep. of Germany

[21] Appl. No.: 100,110

[22] Filed: Dec. 4, 1979

[30] Foreign Application Priority Data

Dec. 9, 1978 [DE] Fed. Rep. of Germany ....... 2853302

[51] Int. Cl.$^3$ ...................... B32B 23/02; B28B 11/08; B29C 17/04
[52] U.S. Cl. .................................... 428/192; 264/291; 264/547; 264/553; 428/156
[58] Field of Search .................. 264/290.2, 291, 292, 264/547, 553, 554; 428/192, 156

[56] References Cited

U.S. PATENT DOCUMENTS

| | | | |
|---|---|---|---|
| 2,365,637 | 12/1944 | Helwig | 264/547 |
| 2,917,783 | 12/1959 | Olson et al. | 264/547 |
| 3,020,596 | 2/1962 | Clapp et al. | 264/547 |
| 3,470,291 | 9/1969 | Johnson | 264/292 |
| 4,228,267 | 10/1980 | Higashizume et al. | 264/291 |

FOREIGN PATENT DOCUMENTS 2514740 10/1976 Fed. Rep. of Germany .
1329330 9/1973 United Kingdom .

*Primary Examiner*—William R. Dixon, Jr.
*Attorney, Agent, or Firm*—Curtis, Morris & Safford

[57] ABSTRACT

A shaped acrylic glass body is provided which has a reshaped inner zone outside the plane of the border or edge region and which is characterized by excellent resistance to weather and to chemical corrosion. The shaped body is manufactured from an extruded plate of a polymer or copolymer containing at least 80% by weight of polymethylmethacrylate or a copolymer of methyl methacrylate. The extruded plate is subjected to biaxial stretching, by at least about 25% in each direction and, while the edges or border regions are gripped to maintain their dimensions, a force is applied to the interior portion of the plate while it is in a thermoelastic state to move the interior portion out of the plane of the surrounding edges.

8 Claims, No Drawings

SHAPED BODY OF EXTRUDED ACRYLIC GLASS

Shaped bodies of cast acrylic glass are used to a large extent in applications where they are exposed to corrosive influences of the weather, moist air and corrosive chemical vapors, possibly with the simultaneous action of ultraviolet light. Typical examples of such shaped bodies are dome lights, illuminated advertising displays and lamp coverings. Shaped bodies of cast acrylic glass are unsurpassed by any other plastic in their resistance to the such corrosive influences. However, the manufacture of cast acrylic glass is cumbersome and expensive. Attempts have, therefore, been made for a long time to use shaped bodies that are produced by reshaping extruded acrylic glass plates, which can be reshaped more easily than cast acrylic plates. Nevertheless the use of such shaped bodies has been limited to fields in which corrosive influences are not ordinarily a factor, for instance, in making lamp coverings for interiors.

Shaped bodies of acrylic glass are manufactured to a considerable extent by clamping the edges of a flat acrylic glass plate in a frame, heating the enclosed area to above the softening point, and reshaping, for instance, by means of compressed air which acts on one side. Shaped bodies produced in this manner have a three-dimensionally reshaped region, for instance a dome, surrounded by a border which lies in the plane of the original plate. If one manufactures such a shaped body of extruded acrylic glass, the three-dimensionally reshaped region is practically just as corrosion-resistant and weather-resistant as a shaped body of cast acrylic glass. On the other hand, the border region lying in the original plane of the plate is definitely more sensitive to mechanical and corrosive stresses. The impact sensitivity of the outer edge can, to be sure, be reduced by the method disclosed in German Offenlegungsschrift No. 25 14 740, but the flat border or edge region, which is generally several centimeters in width, remains unaffected by this shaping procedure. The transition zone from the flat border to the three-dimensionally reshaped region of the shaped body is found to be particularly susceptible to damage; cracks and fissures occur here, particularly if the shaped body is stress mounted. This damage frequently provides the starting point for later fracture of the shaped body. In many cases it appears that the mechanical properties and the corrosion resistance of the acrylic glass is less in this transition zone than those of the flat extruded starting material.

The object of the present invention is to make available shaped bodies produced by the reshaping of flat extruded plates of acrylic glass which have an outer border or edge in the plane of the original plate and a three-dimensionally reshaped region surrounded thereby, the mechanical strength and corrosion resistance of which can withstand the elements as well as a corrosive environment. In particular, it is an object of the invention to provide shaped bodies of extruded acrylic which do not have the disadvantages, in the flat border or edge region and the zone of transition to the three-dimensionally reshaped region, that have been inherent in shaped bodies made in the traditional manner from extruded acrylic glass plates.

It has been found that this purpose can be attained in a shaped body having a three-dimensional shaped area enclosed by a substantially flat border area, the flat border area being stretched biaxially by at least 25%. The shaped bodies of the invention are made from flat, biaxially stretched acrylic glass plates, the term acrylic glass being understood to mean polymethylmethacrylate or a copolymer containing at least 80 weight percent of methylmethacrylate. In the reshaping process of the invention, the edge or border remains unchanged and the area of the plate enclosed thereby is reshaped three-dimensionally. Biaxial stretching is accomplished by applying tension to a plastic plate in two directions perpendicular to each other and in the plane of the plate, said stretching being effected while the plate is in thermoelastic condition and then set by cooling to a temperature below the softening point. The degree of stretch is expressed in percent referring to the original dimension in each of the two directions of stretch. The percentage of stretch is preferably approximately the same in both directions and is generally above about 40% and preferably within the range of 60 to 80%. Three-dimensional reshaping to produce an area which protrudes from the original plane of the plate is accomplished while the plate is in a thermoplastic condition.

It is known that the properties of plastics in general and of cast acrylic glass in particular are improved by biaxial stretching. To be sure, there was skepticism among those skilled in the art whether such an improvement also occurs in the case of extruded acrylic glass. In fact, the relatively good properties in the reshaped region of a shaped body produced from extruded acrylic glass indicate that an improvement in properties results from the stretching which takes place with the reshaping. On the other hand, an impairment in properties can be noted in the above-mentioned transition zone between the flat edge or border and the reshaped region. This is in agreement with the statement made in U.S. Pat. No. 3,852,387 that the chemical and weathering resistance of extruded acrylic glass is reduced when it is subjected to stretching during the extrusion. These disadvantages are to be reduced, according to this patent, by use of expensive devices to avoid any orientation within the acrylic glass when it is extruded during manufacture. The isotropic material so produced is said to be superior in its corrosion properties to the customary slightly oriented material. The orientation in traditional acrylic glass is ascribed to the flow processes of the material in the extrusion nozzle. Such orientations can subsequently be eliminated by heating the extruded acrylic glass pane for a sufficiently long period of time at above its softening temperature, but even this procedure does not eliminate the reduction in resistance to chemicals and weathering in the edge or border region of a shaped body so produced. The impairments in the properties reported in this patent are explicable as the result of a substantially monoaxial stretching in the manufacture of extruded acrylic glass when the material is withdrawn with a certain force from the extrusion nozzle. Upon the manufacture of shaped bodies, a monoaxial stretching takes place in the aforementioned transition zone between the non-reshaped edge or border and the reshaped region. However, if one starts in accordance with the invention, i.e., with an acrylic glass plate which has already been biaxially stretched, then, while an additional monoaxial stretching is produced in the transition zone, nevertheless the stretch already originally present perpendicular thereto remains. A monoaxially stretched zone which is particularly sensitive to corrosion is thereby avoided. In addition, the properties in the flat or border edge region are clearly improved as compared with unstretched extruded acrylic glass, so that the resistance of the shaped plate as a whole to weather exposure and to other corrosive influences substantially corresponds to that of shaped bodies of cast acrylic glass.

Although the invention may, by hindsight, be considered to involve the application of the known principle of improving properties by stretching, this was apparently not so obvious to those skilled in the art as to satisfy the long-existing need for the manufacture of corrosion-resistant and weathering-resistant shaped bodies of extruded acrylic glass in accordance with the invention. Extruded acrylic glass has been produced for decades by numerous manufacturers and worked into shaped bodies, particularly lamp coverings for interior rooms. The technology for the manufacture of biaxially stretched extruded acrylic glass has been also known for many years from German Offenlegungsschrift No. 20 56 697. The fact that shaped bodies having the advantageous properties of the invention have not been known up to the present time can only be explained by a lack of recognition in the art that the disadvantages referred to, particularly within the edge or border region, were the consequence of different degrees of stretching. The solution of the problem in question by means of the present invention was possible only after appreciation of these consequences and further recognition that different degrees of stretching in different directions within the reshaped acrylic glass do not result in any disadvantageous properties provided a given minimum stretch is exceeded in each direction of the plate.

As already mentioned, the manufacture of extruded acrylic glass plates stretched biaxially by at least 25% in each direction is known. The working of such plates into the shaped bodies of the invention also affords no difficulties since the same technology can be employed as that by which cast, stretched acrylic glass can be worked. The reshaping forces necessary for the extruded stretched acrylic glass, which as a rule has a molecular weight within the range of 50,000 to 300,000, are even less than upon the reshaping of stretched cast acrylic glass having a molecular weight of several million.

For the reshaping, the cold stretched extruded acrylic glass plate can be inserted in a clamping frame and can be heated with the latter within the thermoelastic range of state of the acrylic glass. In this way, the stretching forces which were frozen in the plate are released. One therefore requires a strong clamping frame and high closing forces in order to prevent reshrinking of the material. The clamped acrylic glass plate can now be reshaped in thermoelastic condition. Any known reshaping method can be employed, for example freeblowing with compressed air to form a dome, reshaping with a negative form by means of vacuum or pressure, reshaping by means of mechanical forming dies, and combinations of these reshaping methods.

The edge held by the clamping frame is preferably not also heated. For example, the plate, which is clamped while cold, can be heated by means of radiant heat, the border or edge region remaining below the softening temperature. In this connection, the border or edge itself takes up a part of the frozen restoring forces so that one can get along with lower closing forces and a lighter frame construction.

Shaped bodies of considerable size constitute preferred objects of the invention. The largest diameter of the reshaped region is preferably at least about 30 cm and preferably at least 50 cm, but may also reach a length of several meters. The peak height, i.e. the highest elevation of the shaped body above the original plane of the plate is about 25 to 75% of the largest diameter of the three-dimensionally reshaped region in the case of the preferred embodiments.

The flat reshaped edge or border region need not extend in all cases up to the outer edge of the plate, although it generally does in the preferred embodiment. The plate edge can consist of a bead edge formed by reshrinking in thermoelastic condition. However, it may also be bent over in direction opposite that of the reshaped region, for instance in the form of a drip edge for a light dome. The border lying in the original plane of the plate has, as a rule, a width of between about 2 and 10 cm and a thickness of about 1 to 8 mm. The three-dimensionally reshaped region can be thinner than the edge or border region, depending on the local degree of stretch.

Light-transmitting shaped bodies of the invention are most useful in light domes, skylights, illuminated advertising signs, light coverings and the like. The shaped bodies may be transparent or translucent, colorless, milky or colored. They may be provided on one or both surfaces with structures, i.e., protrusions or indentations, which are produced either during reshaping by means of a suitable embossing tool, or which be shaped while in the thermoplastic state during production of the still unstretched extruded acrylic glass pane.

What is claimed is:

1. A shaped body produced by the reshaping of an originally-flat extruded sheet of acrylic glass having a molecular weight between 50,000 and 300,000, said shaped body having a three-dimensionally reshaped region surrounded by a flat border in the plane of the originally-flat sheet, said flat border being stretched biaxially by at least 25 percent in each direction, said shaped body further having transition zones, between said three-dimensionally reshaped region and said surrounding flat border, which are less sensitive to mechanical and corrosion damage than are corresponding transition zones in a reshaped extruded sheet of acrylic glass not having a flat border stretched biaxially by at least 25 percent in each direction.

2. A shaped body as defined in claim 1, wherein the border region is stretched biaxially by 40 to 80% in each direction.

3. A shaped body as defined in claim 1, wherein the border region has a thickness of about 1 to 8 mm.

4. A shaped body as defined in claim 1, wherein the crown height of the three-dimensionally reshaped region above the plane of the flat border region is about 25 to 75% of the maximum diameter of said reshaped region.

5. A shaped body as defined in claim 1, wherein the largest diameter of the reshaped region is at least about 30 cm and preferably at least 50 cm.

6. A shaped body as defined in claim 1, wherein the shape of the three-dimensionally reshaped region is a shape which can be produced by free blowing with pressure or vacuum.

7. A shaped body as defined in claim 1 which is transparent to light.

8. A process for manufacturing a shaped body as defined in claim 1 which comprises biaxially stretching, by at least about 25% in each direction, an extruded sheet of a polymer or copolymer containing at least 80% by weight of units of methyl methacrylate, then gripping the edges of the plate to maintain its dimensions and applying a force to the interior portion of the sheet while the sheet is in a thermoelastic state to move said interior portion out of the plane of the surrounding edges thereof.

* * * * *